United States Patent [19]

Thomas

[11] Patent Number: 4,815,818

[45] Date of Patent: * Mar. 28, 1989

[54] THREE-DIMENSIONAL FLEXIBLE REFLECTORS

[75] Inventor: Robert J. Thomas, Anchorage, Ak.

[73] Assignee: Eagle Industries, Inc., Anchorage, Ak.

[*] Notice: The portion of the term of this patent subsequent to Mar. 4, 2003 has been disclaimed.

[21] Appl. No.: 822,857

[22] Filed: Jan. 27, 1986

Related U.S. Application Data

[63] Continuation-in-part of Ser. No. 682,836, Dec. 18, 1984, Pat. No. 4,573,763.

[51] Int. Cl.$^4$ .......................... G02B 5/122; E01F 9/00
[52] U.S. Cl. ..................................... 350/102; 350/105
[58] Field of Search ................. 350/97, 100, 102, 103, 350/105; 404/10, 14

[56] References Cited

U.S. PATENT DOCUMENTS

| | | | |
|---|---|---|---|
| 3,836,227 | 9/1974 | Holmen et al. | 350/105 |
| 3,879,148 | 4/1975 | Eigenmann | 404/10 |
| 3,890,054 | 6/1975 | O'Connor | 404/10 |
| 4,035,059 | 7/1977 | DeMaster | 350/105 |
| 4,388,359 | 6/1983 | Ethen et al. | 350/105 |
| 4,573,763 | 3/1986 | Thomas | 350/105 |

Primary Examiner—John K. Corbin
Assistant Examiner—Loha Ben
Attorney, Agent, or Firm—Stevens, Davis, Miller & Mosher

[57] ABSTRACT

A reflector is provided which includes a resilient member formed of elastomeric material having embedded in at least a portion thereof a plurality of retro-reflective glass beads. At least a portion of the outer surface of the elastomeric material is removed to expose at least a portion of the glass beads thereat. The resilient member can be formed either with or without a base member. The base member can be formed either integrally or non-integrally with the resilient member to serve as a support body for the resilient member. When formed with a base member, at least the distal end of the resilient member has a surface portion of the elastomeric material forming the resilient member removed to expose at least a portion of the glass beads thereat.

3 Claims, 5 Drawing Sheets

U.S. Patent   Mar. 28, 1989   Sheet 1 of 5   4,815,818
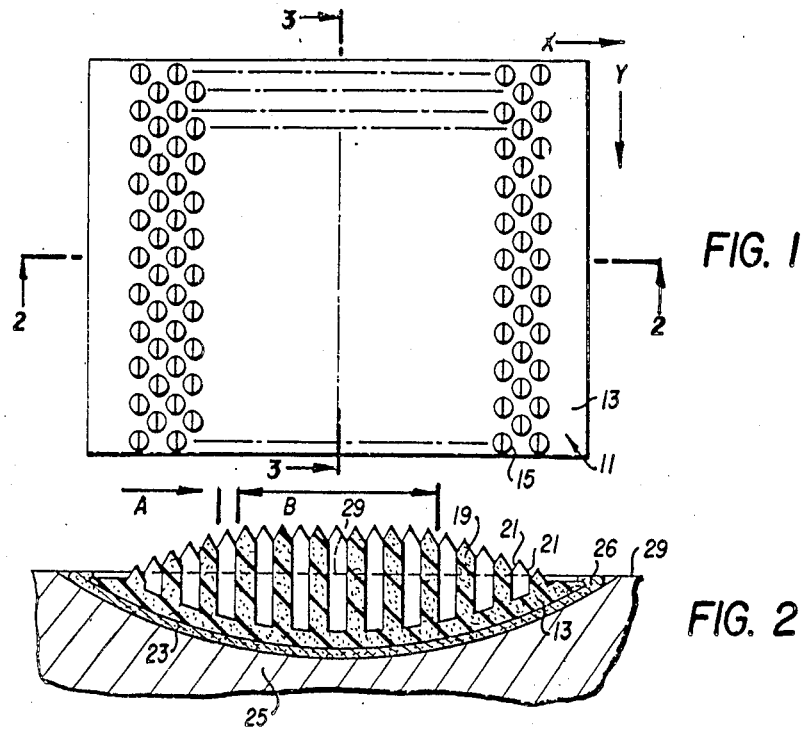
FIG. 1
FIG. 2
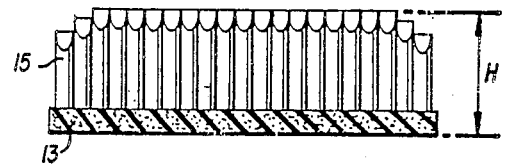
FIG. 3
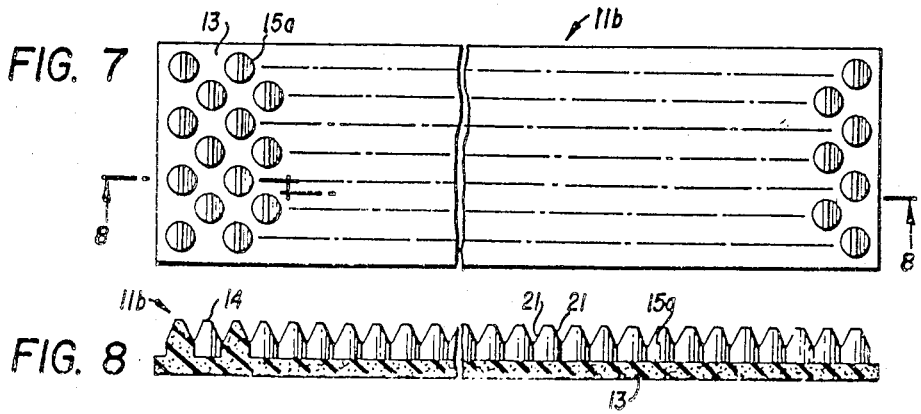
FIG. 7
FIG. 8

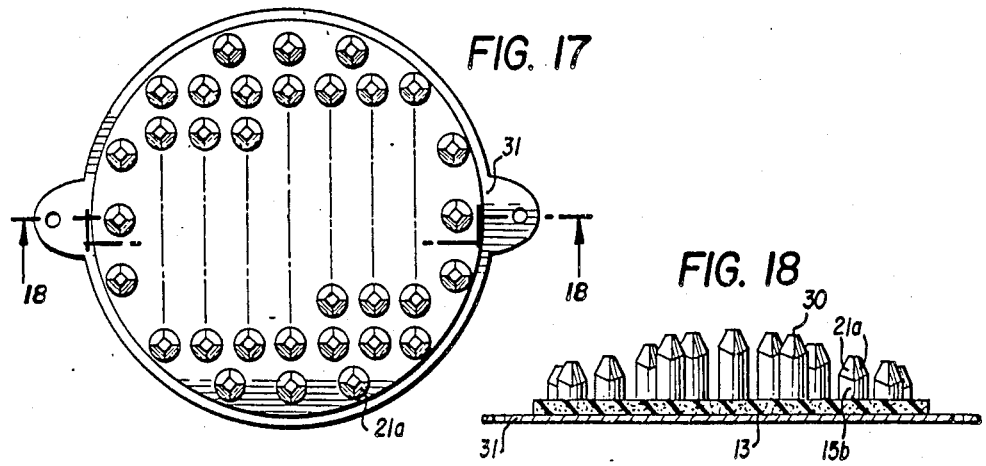
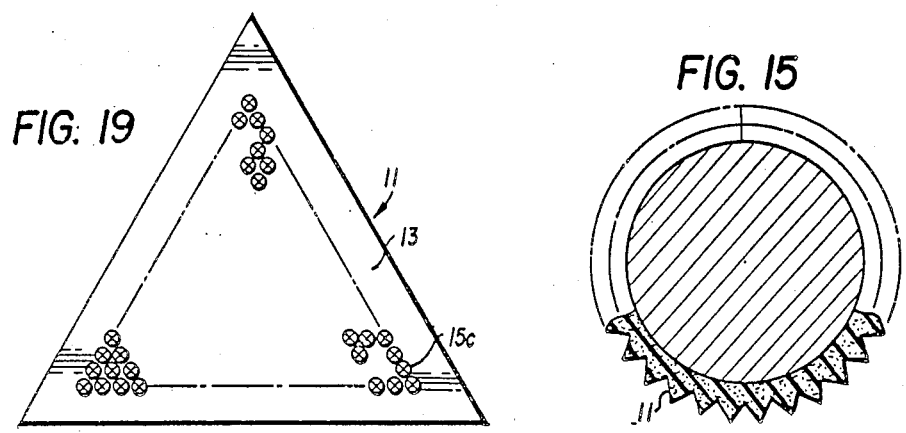
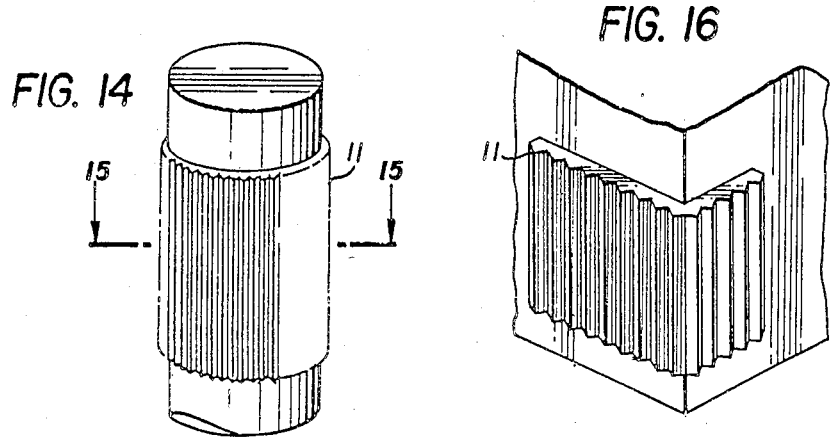

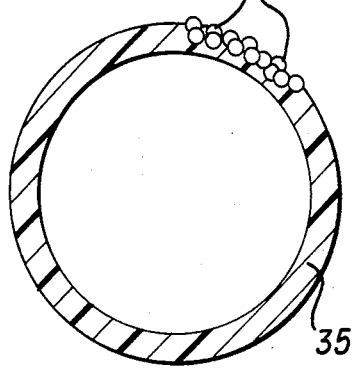
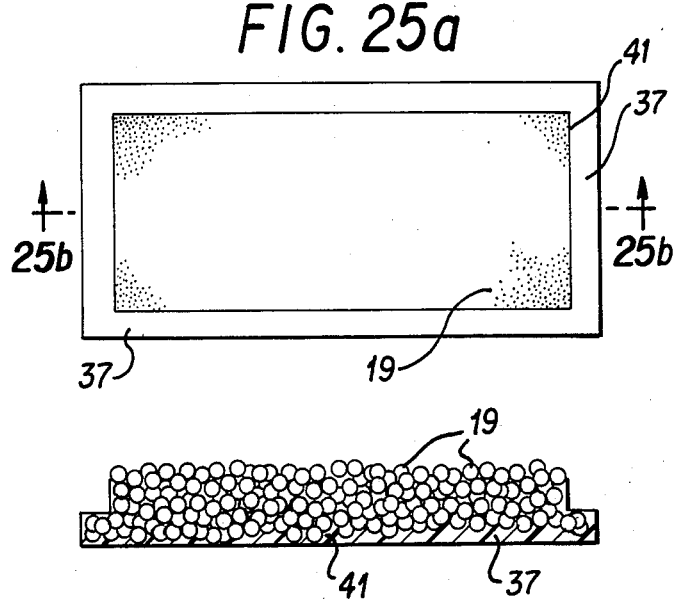
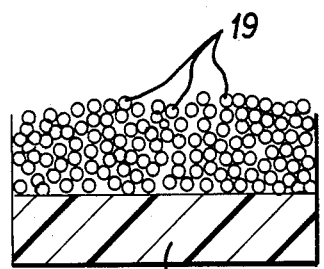
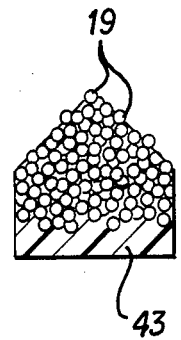
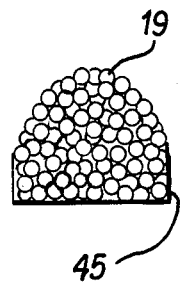

THREE-DIMENSIONAL FLEXIBLE REFLECTORS

This application is a continuation-in-part of U.S. patent application Ser. No. 682,836, filed Dec. 18, 1984, now U.S. Pat. No. 4,573,763.

BACKGROUND OF THE INVENTION

1. Field of the Invention

The present invention relates to three-dimensional flexible reflectors and, more particularly, to three-dimensional flexible reflectors which are designed to reflect vehicle lights back to an operator as an information or warning function. As used in the present application, the term three-dimensional refers to a reflector which has a length, width and an appreciable depth, in contrast to tapes, sheets and coatings that are essentially two-dimensional, that is having a length and width but no appreciable depth. The invention also relates to three-dimensional flexible reflectors which are particularly suitable for use as roadway markers.

2. Discussion of the Prior Art

Various types of reflecting devices are known in the art for use on signs, roadways and vehicles, among other things. Typically, such reflectors are formed of rigid materials which, when broken, may create a hazardous condition. For example, a deformed, broken or scrapped off reflector on roadways, barricades, posts, walls, signs and other stationary items, as well as on vehicles and toys, can create a serious safety hazard, in that the reflective properties of the reflector per se are diminished and further in that the rigid broken reflector can create harm to persons and objects which may come in contact with it.

SUMMARY OF THE INVENTION

Accordingly, there are many instances where a flexible, abrasion resistant, unbreakable reflector would be desirable for the safety of persons and property. In addition, a flexible, unbreakable reflector could also provide new opportunities for use, as such reflectors may be molded into the soles and heels of shoes, as well as other personal items, such as attachments to baggage, purses, belts, jewelry, dog collars, etc., which may be subject to exposure to vehicular traffic.

Accordingly, one object of the invention is the provision of a practical, easy to manufacture, economical yet virtually indestructible, flexible reflector which retroreflects light, generally without regard to the mounting plane of the reflector or the angle of approach of a light source.

Another object of the invention is the provision of a flexible reflector, as described above, which uses retroreflective glass spheres in a cast or molded admixture containing an elastomer, in which a portion of the elastomer is removed or reduced at the surface of the reflector to allow those spheres near the surface to exhibit their maximum reflective optical qualities.

Another object of the present invention is the provision of a flexible reflector which is durable and maintains highly effective properties, even under the most intemperate climatic conditions and the most abrasive treatement by vehicular traffic.

Another object of the present invention is the provision of a flexible reflector, as described in the preceding paragraph, which is particularly well adapted for use on roadways and resistant to any harmful effects produced by road clearing equipment, such as surface cleaners and snow plows.

The above and other objects, advantages and features of the invention are attained in a three-dimensional reflector which is formed from an elastomeric matrix, supporting retro-reflective glass spheres which are dispersed throughout or through at least preselected portions of the reflector, with at least a preselected area, if not the whole area, of the surface of the reflector having portions of the elastomeric matrix removed or reduced to allow those spheres near the surface to assume their proper retro-reflective qualities.

In its broadest aspects, the above and other objects, advantages and features of the present invention are achieved by a reflector comprising a resilient member of elastomeric material having embedded in at least a portion of said resilient member a plurality of retro-reflective glass beads, at least a portion of the outer surface of the elastomeric material being removed to expose at least a portion of the glass beads thereat. Additionally, the resilient member can be formed either integrally or non-integrally with a base member which forms a support body for the resilient member, with the resilient member having embedded in at least a portion thereof a plurality of retro-reflective glass beads, at least the distal end of the resilient member having a surface portion of the elastomeric material forming the resilient member removed to expose a portion of the glass beads thereat.

The above and other objects, advantages and features are also achieved by a reflector comprising a base member of elastomeric material forming a support body for the reflector, and a plurality of grouped individual resilient members of elastomeric material integrally formed with the base member and projecting upwardly therefrom, each of the resilient members having embedded therein a plurality of reflective glass beads, with a portion of the elastomeric material being removed along at least a portion of the surface of the reflector to expose some of said glass beads.

BRIEF DESCRIPTION OF THE DRAWINGS

The above objects, advantages and features of the invention will be more readily understood from the following detailed description thereof, which is taken in connection with the accompanying drawings, in which:

FIG. 1 is a top plan view of a first embodiment of a reflector of the invention;

FIG. 2 is a sectional elevation taken along the line 2—2 of FIG. 1;

FIG. 3 is a sectional elevation taken along the line 3—3 of FIG. 1;

FIG. 7 is a top plan view of a second embodiment of the invention;

FIG. 8 is a sectional elevation taken along the line 8—8 of FIG. 7;

FIG. 14 is a perspective fragmented view of a section of a post containing a reflector of the type illustrated in FIG. 13 attached thereto;

FIG. 15 is a top sectional elevation taken along the line 15—15 of FIG. 14;

FIG. 16 is a perspective fragmented view of a section of a corner containing a reflector of the type illustrated in FIG. 13;

FIG. 17 is a top plan view of a fifth embodiment of the invention;

FIG. 18 is a side elevational view of FIG. 17 along the line 18—18;

FIG. 19 is a front plan view of a sixth embodiment of the invention;

FIG. 24 is a sectional view of yet another embodiment of the invention;

FIG. 25a and FIG. 25b are a top plan view and a sectional view, respectively, of still another embodiment of the invention;

FIG. 26 is a side view of another embodiment of the invention;

FIG. 27 is a sectional view of the embodiment of FIG. 26; and

FIG. 28 is a sectional view of yet another embodiment of the invention.

DETAILED DESCRIPTION OF THE INVENTION

Figure 22:
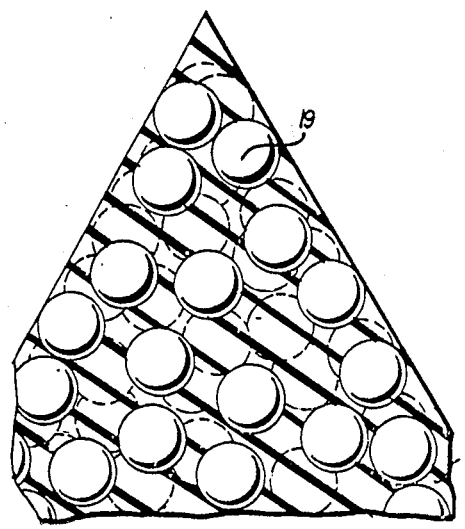
FIG. 22 illustrates a portion of a reflector constructed in accordance with the invention before being treated to remove a surface portion of an elastomeric material.

FIGS. 1-3 illustrate a first embodiment of a reflector constructed in accordance with the invention. In this embodiment, a reflector 11 is formed by a resilient base member 13, which has integrally formed therewith upstanding resilient members constructed as a plurality of closely spaced, that is, densely packed, resilient fingers 15. As shown in FIGS. 1-3, the resilient fingers are staggered relative to one another in rows and columns. The base member 13 and resilient fingers 15 are integrally formed of a flexible, abrasion resistant elastomeric material, such as polyurethane. At least the upstanding resilient fingers 15 have their elastomeric material encapsulating and holding in matrix suspension and throughout fingers 15 a plurality of retro-reflective glass beads 19, shown, for example, in greater detail in FIGS. 22 and 23 described below. The base member 13 may also be formed as a matrix with glass beads 19 dispersed throughout.

In order to enhance the reflective properties of the reflector marker 11, at least the upper portion, that is the distal ends of the resilient fingers 15 have a surface portion of the elastomeric material forming the fingers removed, as described in greater detail below, to thereby expose glass beads at or near the surface so that they may more properly retro-reflect light.

The fingers 15 are closely grouped and are typically spaced so that in one direction (X in FIG. 1) a center-to-center spacing in the range of 5/16" to ⅜" is employed, while in a second direction Y perpendicular to the first, a center-to-center spacing Y in the range of 5/16" to ⅜" is employed.

Because both the base 13 and fingers 15 are made of a resilient abrasion resistant elastomeric material, the reflector 11 is durable and not easily chipped, cracked, fractured or otherwise broken.

To enhance reflective properties of the reflector 11, the distal ends or tips of the fingers 15 are formed as two angled flat surfaces 21 on opposing sides of each finger, which meet at a fingertip. As illustrated in FIG. 1, angled flat surfaces 21 of one finger 15 are oriented in the same direction as corresponding angled flat surfaces on the other fingers 15.

Figure 4:
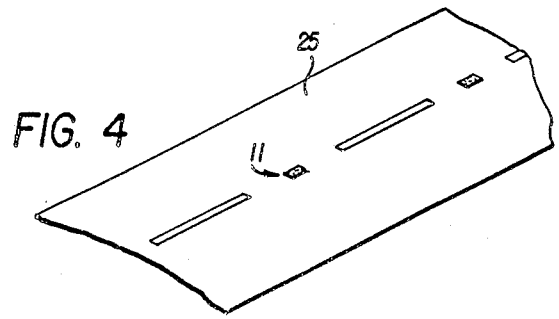
FIG. 4 is a perspective fragmentary view of a section of a roadway, with the reflector of FIG. 1 in position.

As shown in FIG. 2, the base member 13 can be formed with a curve in a direction A to fit a similarly curved surface 23 formed by a socket in a roadway 25. FIG. 4 illustrates the positioning of the reflective marker 11 in roadway 25. The reflector may be held to the road surface by a suitable adhesive layer 26 (FIG. 2), such as epoxy.

As also shown in FIG. 2, once the reflector 11 is properly installed within a socket in roadway 25, the fingers 15 are positioned such that a portion of their upwardly projecting extent projects above the mean level 29 of the roadway, while a portion remains below this mean line. As a consequence, when a snowplow or similar scrapping or clearing equipment passes over the roadway 25 surface, the flexible fingers 15 can bend and be pushed below the mean level 29 of the roadway as the blade or other object carried on the roadway 25 surface passes over reflector 11. This ensures that the fingers 15 will not be severed, but will instead escape damage. Once a snowplow blade or other obstruction passes over the reflector, the resiliency of the fingers 15 causes them to be restored to their full upright position.

As also illustrated in FIGS. 2 and 3, the fingers 15 extend upwardly from base 13 to different heights, depending on their location on reflector 11. Thus, when moving in a direction of arrow A in FIG. 2, the fingers become progressively longer (higher) to a maximum height (after four or five rows) at which point they remain at the maximum height (FIG. 3) for a length B (FIG. 2), after which they begin diminishing in height for the last four or five rows. This enables the roughened tips of the reflectors, where the glass beads are best exposed, to present a reflecting profile to oncoming vehicles in two directions from one end of the reflector 11 to the other. Typically, the maximum height of fingers 15 will be in a range of ¾" to 1¼". The fingers also are shown as having a cylindrical cross-section having a diameter of ⅛" to ⅜".

As shown in FIGS. 2 and 3, in the embodiment thus far described, the changing height profile for the fingers 15 is essentially only in the direction A, which is the direction of longitudinal extend of a roadway. In a widthwise direction, as shown in FIG. 3, the majority of the upwardly projecting fingers have the same height, with only fingers adjacent the edges (one or two rows on each side) having a reduced height. However, reflector 11 can also be constructed to have the same height profile shown in FIG. 2 in both a longitudinal and widthwise direction, if desired. Fingers 15 preferably have a cylindrical cross-sectional shape, except at the angled tips thereof, but other cross-sectional shapes, e.g., square, rectangular, can also be used.

The embodiment of the invention illustrated in FIGS. 1-3 also has a self-cleaning feature. The staggering of closely-packed fingers 15, the ability of the fingers to bend down below a mean road surface, and the curved resilient base member 13 cooperate together to dislodge debris when a snow plow blade or like object passes over reflector 11. The shock wave created by the passing of such an object will, in effect, cause accumulated debris to be squeezed out of reflector 11 ahead of the shock wave.

Figure 5:
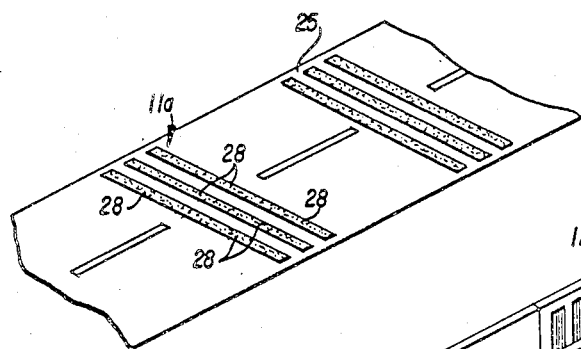
FIG. 5 is a perspective fragmentary view of a section of a roadway containing an elongated version of the FIG. 1 embodiment of the invention.

FIG. 5 illustrates reflector 11a, which is similar to that illustrated in FIGS. 1-3, but having an extended width so as to extend substantially across the entire width of a roadway 25. This particular type of reflector 11a would be particularly useful where an audible and/or bumpy feeling is required in the roadway surface to warn an operator of a particular road condition, such as to slow down for a toll booth. If desired, portions 28 of the roadway can be left intact, that is, not removed when forming a reflector socket and reflector 11a can be segmented between portions 28 to provide a roadway surface over which a scrapping blade, such as a snowplow, can pass.

Figure 6:
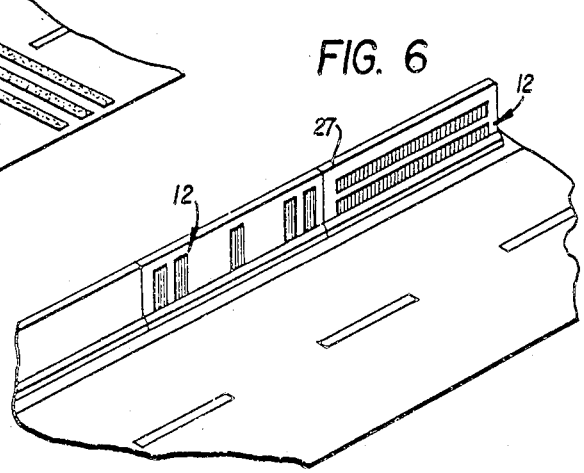
FIG. 6 is a perspective fragmentary view of a section of a roadway barricade, showing the use of vertically mounted reflectors constructed in accordance with other embodiments of the invention, illustrated more clearly in subsequent FIGS. 7 through 13.

Thus far, reflectors particularly useful for horizontal roadway mounting have been described; however, reflectors constructed in accordance with the invention can be used vertically as well. FIG. 6 illustrates reflective markers in the form of strips 12 vertically applied to barricades 27 for a roadway. Various embodiments which the vertical strips 12 can assume are shown in greater detail in FIGS. 7-13.

The second embodiment of the invention, illustrated in FIGS. 7 and 8, is similar to that illustrated in FIGS. 1-3, except all of the fingers 15a of reflector 11b which project upwardly from base member 13 have substantially the same height. In addition, fingers 15a are somewhat smaller in height than the fingers 15 in the first embodiment described above. A height of ⅛" to ½" from base member 13 is appropriate. As shown in the sectional view of FIG. 8, the fingers 15a have a similar tip construction as the fingers 15 in FIGS. 1-3, including the angled flat surfaces 21; however, the top 14 of the fingers is flattened, instead of pointed as in the FIGS. 1-3 embodiment. The embodiment of FIG. 7 is particularly suitable for mounting as a strip on a barricade, sign or other vertical surface, as shown in FIG. 6. As in the first embodiment, the fingers 15a are also constructed such that they have a plurality of glass beads 19 embedded therein. Moreover, both the fingers 15a and the base member 13 are formed of elastomeric material, as in the previous embodiment.

Figure 9:
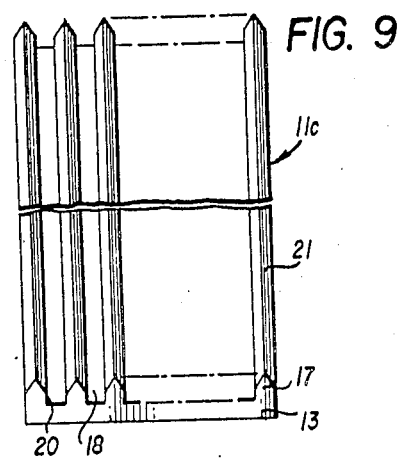
FIG. 9 is a top perspective view of a third embodiment of the invention.
Figure 10:
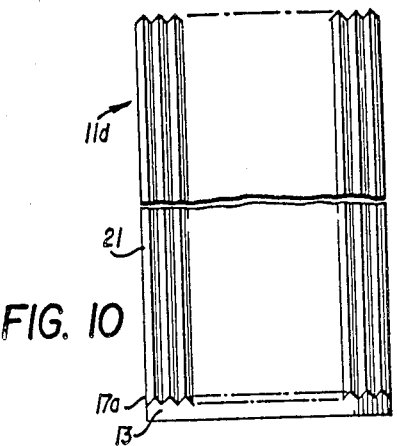
FIG. 10 is a top perspective view of a fourth embodiment of the invention.
Figure 11:
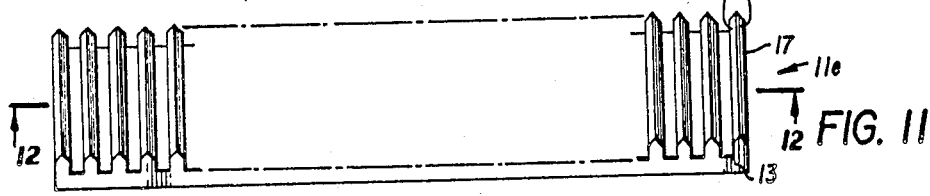
FIG. 11 is a top perspective view of an elongated version of the FIG. 9 embodiment of the invention.

FIGS. 9-11 respectively illustrate three additional embodiments of the reflector of the invention. In FIG. 9, the base member 13 of reflector 11c contains a plurality of upstanding resilient members formed as resilient ribs 17, instead of the fingers employed in the previous embodiments. The ribs 17 are formed of an elastomeric material and have embedded therein glass beads 19, as in the prior embodiments. In the FIG. 9 embodiment, rows of ribs 17 are spaced from one another by areas 18 which do not contain like ribs 17. In the FIG. 10 embodiment, the ribs 17a of reflector 11d are closely adjacent one another, with no space being provided therebetween. Also, in FIG. 9, the ribs 17 have a portion thereof constructed as upwardly directed sidewalls 20 intermediate the angled surfaces 21 and base member 13, whereas in FIG. 10, angled surfaces 21 are directly connected to base member 13, forming a saw-tooth type of top surface profile.

Figure 13:
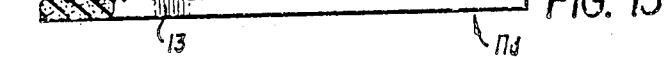
FIG. 13 is a sectional elevation similar to FIG. 12, but for the FIG. 10 embodiment.

FIG. 13 illustrates a sectional view of the reflector 11d illustrated in FIG. 10, showing in greater detail how the resilient ribs 17a are formed very close to the base member 13 without projecting substantially therefrom, as in the prior embodiments of the invention. However, once again, the ribs 17a are integrally formed with the base member 13, with at least the ribs 17a containing embedded glass beads. As was true with prior embodiments, the base member 13 may also have embedded glass beads therein.

Figure 12:
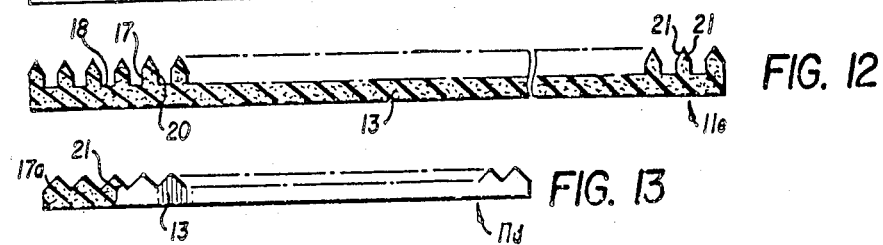
FIG. 12 is a sectional elevation taken along the line 12—12 of FIG. 11.

FIG. 11 illustrates an embodiment very similar to FIG. 9, that is with spaced upstanding resilient ribs 17 attached to a base member 13, with both being integrally formed of an elastomeric material. Once again, at least the ribs 17 of reflector 11e contain embedded glass beads. The only difference in construction between the reflectors of FIGS. 9 and 11 is that the FIG. 11 reflector 11e is constructed as an elongated strip reflector. FIG. 12 illustrates a sectional view of the reflector 11e of FIG. 11, showing in greater detail the space 18 between the ribs 17 and the upstanding sidewalls 20.

Various uses to which the strip-like reflectors of FIGS. 9-13 can be put are illustrated in FIGS. 14-16. FIGS. 14 and 15 illustrate the wrapping of a strip-like reflective marker 11 about a post, while FIG. 16 illustrates the application of a reflective marker to a corner of an object. The reflector can be held in place by any suitable adhesive or even a double-sided tape. Alternatively, screws, rivets or nails can be used to fasten the reflector to a mounting surface.

FIGS. 17 and 18 illustrate yet another embodiment of a reflector of the invention. This embodiment, which is similar to the first embodiment, employs a plurality of upstanding elastomeric fingers 15b, the tips of the fingers being formed by four angled flat surfaces 21a, instead of two as in earlier embodiments. The four angled flat surfaces 21a meet at a flat top 30. As also shown in FIG. 17, the plurality of upstanding fingers 15b are arranged in a circular-type reflector having a mounting plate 31 of metal or other rigid material. As with prior embodiments, the fingers 15b are formed of an elastomeric material containing embedded glass beads, while base member 13, which is integrally formed therewith, also is formed of an elastomeric material which may also contain glass beads therein.

FIG. 19 illustrates an embodiment of another reflector of the invention, which also employs densely packed upstanding fingers 15c, constructed like those shown in FIGS. 17, 18, and which is most suitable for use as a sign reflector or other vertically oriented reflector.

Figure 20:
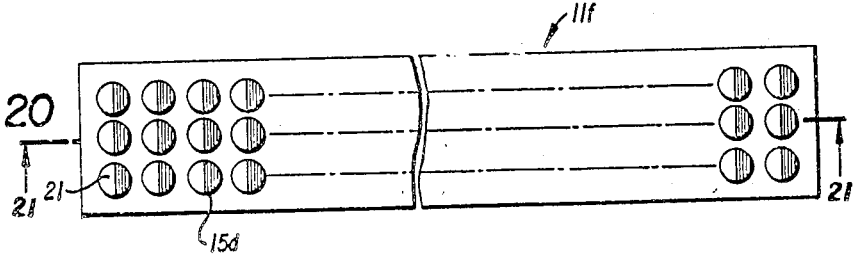
FIG. 20 is a top plan view of a seventh embodiment of the invention.
Figure 21:
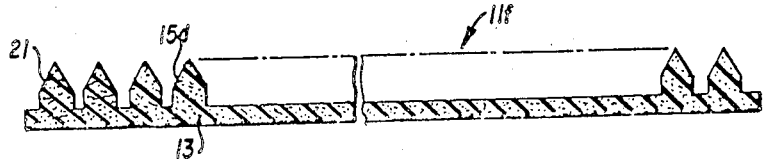
FIG. 21 is a sectional elevational view taken along the line 21—21 in FIG. 20.

FIGS. 20 and 21 illustrate yet another embodiment of the invention, wherein a strip-like reflector 11f is formed by a plurality of upstanding fingers 15d. In this embodiment, the fingers 15d, which are like those shown in FIGS. 7, 8, but having a point at their distal end, are arranged in regularly spaced rows and columns and are not staggered, as in other embodiments of the invention. Pairs of angled surfaces 21 are provided at the distal ends of fingers 15d.

Figure 23:
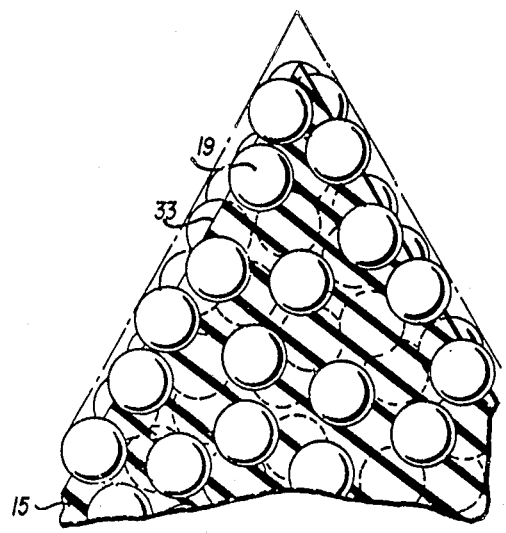
FIG. 23 illustrates the portion of a reflector shown in FIG. 22 after the elastomeric material is partially removed to expose glass beads contained therein.

As noted above, a key feature of the above embodiments of the invention is the removal of a portion of the elastomeric material from the upper surfaces of at least a portion of the projecting resilient members. To accomplish this material removal, an abrasion technique may be employed. FIG. 22 illustrates, for example, a pointed distal end of a finger 15, employed in the FIGS. 1-3 embodiment, before surface removal of a portion of the elastomeric material, while FIG. 23 illustrates the same structure after a surface portion of the elastomeric material is removed to expose the glass beads 19 in an upper surface of the resilient member. The elastomeric material may be removed by any of a number of conventional techniques for surface removal or reduction, such as by high energy blasts, very short-term high heat exposure, or high speed abrasion.

FIG. 24 shows a resilient member 35, which has a tubular shape, formed of elastomeric material. Resilient member 35 has embedded therein a plurality of retro-reflective glass beads 19. As shown, a portion of the outer surface of the elastomeric material of which member 35 is formed has been removed so that a portion of glass beads 19 are exposed.

FIGS. 25a and 25b show a resilient member 37 which has a flat, rectangular shape. Member 37 is formed of an elastomeric material. A border region 39 is thinner than interior region 41 of member 37. As shown in FIG. 25b, the outer surface of the elastomeric material forming member 37 is removed in interior region 41 to expose a portion of glass beads 19 thereat.

FIGS. 26 and 27 show a strip 43 of elastomeric material having retro-reflective glass beads 19 embedded therein, with a portion of the outer surface of the elastomeric material removed to expose a portion of beads 19. FIG. 28 illustrates an alternative shape for strip 43, with retro-reflective glass beads 19 embedded generally throughout its extent, but in other respects similar to the embodiment of FIGS. 26 and 27.

It should be noted that a key feature of the embodiments of FIGS. 24-28 is that a single, individual resilient member formed of elastomeric material has embedded in at least a portion thereof a plurality of retro-reflective glass beads and that at least a portion of the outer surface of the elastomeric material is removed to expose at least a portion of the glass beads thereat. The present invention is not limited with respect to the dimensions and shapes of the resilient member. Thus, the resilient member can have the shape of cylinders, rings, tubes, tennis shoe heels, joggers' armbands, adhesive letters, or vehicle bumper reflectors, to illustrate a few possible applications and shapes. Moreover, the resilient member can have the shape of a single strip of resilient member of elastomeric material to form a vehicle trim, e.g., for application to motor vehicles. Such trim would provide a "line of sight" at night to vehicles approaching perpendicular to, or attempting to pass, a vehicle so equipped. The brightness of the light line can be easily controlled by varying the density of the bead mixture. This would provide a very significant added safety feature at little additional cost.

It should also be noted that the retro-reflective glass spheres or beads can be dispersed throughout or through at least pre-selected portions of the resilient member, with at least a pre-selected area, if not the whole area, of the surface of the reflector having portions of the elastomeric matrix removed or reduced to allow those spheres or beads near the surface to assume their proper retro-reflective qualities.

In all of the embodiments above, the elastomeric material is preferably a thermoplastic or thermosetting polyurethane elastomer, and preferably a thermo-plastic polyurethane resin, one of which is available under the trade name TEXIN from Mobay Chemical Company.

Since polyurethane resins are available in several different durometers for different degrees of hardness, flexural strength and abrasion resistance, the reflector of the invention can be easily constructed, as by casting, injection molding, etc., to meet particular end use requirements. For most uses, a hardness in the range of ASTM standard Shore 85A to 110A for the projecting resilient members, e.g., fingers, ribs, is sufficient, while a hardness in the range of Shore 85A to 75D is sufficient for the base member. The retro-reflective glass spheres employed in the invention are available in a variety of refractive indices and sizes from a number of sources, for example, Potter Industries. Preferably, the glass spheres have a screen mesh size in the range from 20 to 120.

As is apparent from the foregoing description, many modifications and changes can be made in the invention without departing from its spirit and scope. For example, although the resilient members projecting from base member 13 have been specifically described in the various embodiments as being shaped as fingers or ribs, other projecting shapes such as rounded bumps, dots, etc. can also be employed. Also, the center-to-center spacing for projecting fingers, dots, etc. can vary from ⅛" to ½". Accordingly, the foregoing description is not to be considered as limiting of the invention, the invention being limited only by the scope of the claims which are appended hereto.

I claim:

1. A reflector, comprising a resilient member of elastomeric material having embedded in at least a portion of said resilient member a plurality of retro-reflective glass beads, at least a portion of an outer surface of the elastomeric material being removed to expose at least a portion of the glass beads thereat, wherein said resilient member is formed integrally with a base member forming a support body for said resilient member, at least a distal end of said resilient member having a surface portion of the elastomeric material forming the resilient member removed to expose at least a portion of the glass beads thereat, and wherein the elastomeric material forming said base member has a hardness in the range of Shore 85A to Shore 75D.

2. A reflector, comprising a resilient member of elastomeric material having embedded in at least a portion of said resilient member a plurality of retro-reflective glass beads, at least a portion of an outer surface of the elastomeric material being removed to expose at least a portion of the glass beads thereat, wherein the elastomeric material forming said resilient member has a hardness in the range of Shore 85A to Shore 110A.

3. A reflector, comprising a resilient member of elastomeric material having embedded in at least a portion of said resilient member a plurality of retro-reflective glass beads, at least a portion of an outer surface of the elastomeric material being removed to expose at least a portion of the glass beads thereat, wherein said glass beads have a screen mesh size in the range of 20 to 120.

* * * * *